US008671532B2

(12) United States Patent
Shibata et al.

(10) Patent No.: US 8,671,532 B2

(45) Date of Patent: Mar. 18, 2014

(54) EYEGLASS LENS PROCESSING APPARATUS

(75) Inventors: Ryoji Shibata, Aichi (JP); Shinji Koike, Aichi (JP)

(73) Assignee: Nidek Co., Ltd., Aichi (JP)

( * ) Notice: Subject to any disclaimer, the term of this patent is extended or adjusted under 35 U.S.C. 154(b) by 966 days.

(21) Appl. No.: 12/731,434

(22) Filed: Mar. 25, 2010

(65) Prior Publication Data

US 2010/0247253 A1 Sep. 30, 2010

(30) Foreign Application Priority Data

Mar. 26, 2009 (JP) ................................ 2009-077534

(51) Int. Cl.
*B23P 13/00* (2006.01)
*B24B 49/00* (2012.01)
*B23C 1/14* (2006.01)
*B24B 51/00* (2006.01)

(52) U.S. Cl.
USPC ................ 29/26 A; 29/27 C; 451/71; 451/42; 451/255

(58) Field of Classification Search
USPC ............... 451/65, 67, 71, 41, 42, 43, 44, 255, 451/256, 323, 325; 29/26 A, 26 R, 28, 27 R, 29/27 C
See application file for complete search history.

(56) References Cited

U.S. PATENT DOCUMENTS

| | | | | |
|---|---|---|---|---|
| 5,423,712 | A * | 6/1995 | Underwood et al. | 451/8 |
| 6,785,585 | B1 * | 8/2004 | Gottschald | 700/159 |
| 6,790,124 | B2 * | 9/2004 | Shibata | 451/5 |
| 6,830,333 | B2 * | 12/2004 | Feldman et al. | 351/159.75 |
| 7,111,372 | B2 * | 9/2006 | Feldman et al. | 29/26 A |
| 7,219,991 | B2 * | 5/2007 | Weston | 351/57 |
| 7,424,773 | B2 * | 9/2008 | Obayashi et al. | 29/26 A |
| 7,500,315 | B2 * | 3/2009 | Takeichi | 33/28 |
| 7,507,142 | B2 | 3/2009 | Shibata | |
| 8,340,802 | B2 * | 12/2012 | Feldman | 700/117 |
| 2006/0101629 | A1 * | 5/2006 | Kvartler et al. | 29/26 A |
| 2007/0013863 | A1 | 1/2007 | Zelazowski | |

* cited by examiner

*Primary Examiner* — David Bryant
*Assistant Examiner* — Jason L Vaughan
(74) *Attorney, Agent, or Firm* — Sughrue Mion, PLLC

(57) ABSTRACT

An eyeglass lens processing apparatus includes: a mode selector for selecting an auxiliary lens processing mode; an eyeglass data input unit for inputting a first target lens shape of the eyeglass lens and a right target lens shape-to-left target lens shape distance; a first hole data input unit for inputting a position of a first hole, to which a first magnet is attached; a determination unit which determines second target lens shape of the auxiliary lens, a position of a second hole to which a second magnet is attached, positions of third holes to which a bridge is attached; and a processing controller which processes the auxiliary lenses based on the second target lens shape data, and drills the auxiliary lenses based on the second and third hole positions in the auxiliary lens processing mode.

7 Claims, 11 Drawing Sheets

Prior Art

Prior Art

Prior Art

EYEGLASS LENS PROCESSING APPARATUS

BACKGROUND

The present invention relates to an eyeglass lens processing apparatus for processing the periphery of an eyeglass lens and drilling holes in the lens surface.

Clip-on sunglasses are known in which colored auxiliary lenses (sunglasses) are detachably attached to eyeglass lenses (on the front surface side or the rear surface side of the eyeglass lenses) fitted in an eyeglass frame by using metal fittings such as clips. The clip-on sunglasses enable a user to easily and inexpensively obtain the same effect as that of prescription sunglasses while using prescription eyeglass lenses fitted in an eyeglass frame. An auxiliary lens unit using magnets has been proposed as an improvement of the clip-on sunglasses (US 2007/0013863).

FIG. 1A shows an example of a magnet-type auxiliary lens unit shown in US 2007/0013863. FIG. 1B is an assembly view of the auxiliary lens unit (auxiliary eyeglasses). The auxiliary lens unit S10 has an auxiliary lens S13R for the right eye and an auxiliary lens S13L for the left eye, and is provided with magnets S14 attached to the auxiliary lenses S13R and S13L and a bridge S15 connecting the auxiliary lens S13R and the auxiliary lens S13L as necessary parts included in the auxiliary lens unit S10. A hole HF4 is formed on the ear side of each of normal lenses F3R and F3L held by right and left lens frames (rims) F2R and F2L of an eyeglass frame F1, and a magnet F4 is embedded in each hole HF4. The auxiliary lenses S13R and S13L, are made of a material such as colored sunglasses or polarizing plates. The auxiliary lenses S13R and S13L have shapes substantially coinciding with those of the lenses F3R and F3L.

As shown in FIG. 1B, two projections S16 are formed on each end of the bridge S15. Two holes HS15*a* and HS15*b* for the insertion of the two projections S16 are formed in the auxiliary lens S13R. A bushing S17 is fitted on the projections S16 from the rear surface side of the auxiliary lens S13R through the two holes HS15*a* and HS15*b* of the auxiliary lens S13R, whereby the bridge S15 is attached to the auxiliary lens S13R. Likewise, two holes HS15*a* and HS15*b* are formed also in the auxiliary lens S13L. The bushing S17 is fitted on the projections S16 from the rear surface side of the auxiliary lens S13L, whereby the bridge S15 is attached to the auxiliary lens S13L. To fix the bridge S15 to the auxiliary lenses S13R and S13L, screws or the like may also be used.

A hole HS14 for the attachment of the magnet S14 is formed on the ear side of each of the auxiliary lenses S13R and S13L. The magnet S14 is attached so that the position thereof coincides with the position of the magnet F4 of each of the right eye lens F3R and the left eye lens F3L. Therefore, the auxiliary lens unit S10 can be easily attached to and detached from the front surface side of the lenses F3R and F3L of the eyeglass frame F1 by the magnets F4 and S14. This magnet-type auxiliary lens unit S10 can be easily attached and detached compared with the conventional clip-on sunglasses, and as for the appearance, the auxiliary lenses S13R and S13L are fitted to the lenses F3R and F3L so as to look nice.

To use the magnet-type auxiliary lens unit S10 of FIG. 1A, it is necessary to bore the hole HF4 for the attachment of the magnets F4 in the lenses F3R and F3L. Moreover, it is necessary to process the auxiliary lenses S13R and S13L of the auxiliary lens unit S10 so as to have shapes that match with the shapes of the lenses F3R and F3L, and it is also necessary to bore the holes HS14 and the holes HS15*a* and HS15*b* for the attachment of the magnets S14 and the bridge S15 in each of the auxiliary lenses S13R and S13L. For these processings, eyeglass lens processing apparatuses having a drilling function can be used (Japanese Unexamined Patent Application Publication No. 2003-145328 [U.S. Pat. No. 6,790,124] and Japanese Unexamined Patent Application Publication No. 2006-189659 [U.S. Pat. No. 7,507,142]).

However, in the conventional eyeglass lens processing apparatuses having a drilling function, although the processing of the peripheries of the auxiliary lenses S13R and S13L and the drilling of the holes for the attachment of the magnets S14 and the bridge S15 can be performed, it is necessary that the target lens shape data and the data related to drilling such as the positions and shapes of the holes be all input individually, and the operation to input these pieces of data is complicated. In addition, it is difficult to precisely obtain information such as the sizes of the magnets S14 and the bridge S15 of the auxiliary lens unit S10, and for an operator not skilled in the operation of setting data related to drilling, the setting of appropriate conditions for fitting the auxiliary lens unit S10 to the lenses on the eyeglass frame F1 side so as to look nice is difficult and takes time. For example, if the positions of the magnets F4 on the lenses F3R and F3L side and the positions of the magnets S14 on the auxiliary lenses S13R and S13L side do not precisely coincide with each other, the auxiliary lenses S13R and S13L are shifted from the lenses F3R and F3L. Moreover, even if the positions of the magnets S14 are precise, unless the distance between the lens F3R and the lens F3L attached to the eyeglass frame F1 side and the size of the bridge S15 (the size of the projections S16 provided on the right and left sides) are considered and the holes (HS15*a*, HS15*b*) for the attachment of the right and left auxiliary lenses S13R and S13L are not appropriately set with respect to the processed shapes of the auxiliary lenses, the positions of the auxiliary lenses S13R and S13L attached to the eyeglass frame F1 are also shifted.

An object of the present invention is to provide an eyeglass lens processing apparatus with which even a non-expert can easily process the peripheries of auxiliary lenses attached to eyeglass lenses and sets processing conditions related to the holes for the attachment of parts and appropriately process the auxiliary lenses.

To solve the above-mentioned problem, exemplary embodiments of the present invention provide the following arrangements:

(1) An eyeglass lens processing apparatus for processing an eyeglass lens, comprising:

a lens chuck shaft which chucks the lens;

a processing unit including a periphery processing tool for processing a periphery of the lens;

a drilling unit including a drilling tool for drilling the lens;

a mode selector for selecting an auxiliary lens processing mode processing an auxiliary lens after processing a normal lens, wherein the auxiliary lens is to be attached by a magnet to the normal lens held by an eyeglass frame, an eyeglass data input unit for inputting eyeglass data including a first target lens shape of the normal lens and a right target lens shape-to-left target lens shape distance;

a hole position input unit which has a screen through which a position of a first hole, through which a first magnet is to be attached to the normal lens, is input; and a determination unit which determines, when the auxiliary lens processing mode is selected, a second target lens shape of the auxiliary lens, a position of a second hole through which a second magnet is to be attached to the auxiliary lens, positions of third holes to which a bridge connecting both right and left auxiliary lenses each other is to be attached, the determination unit determining the second target lens shape based on the first target lens shape, the determination unit determining the second hole position with respect to the second target lens shape based on the first hole position with respect to the first target lens shape, and the determination unit determining the third hole positions with respect to the second target lens shape based on the right target lens shape-to-left target lens shape distance and a separation distance between the third holes to be processed; and a processing controller which shifts to a stage of processing the auxiliary lens after a stage of processing the normal lens, processes a periphery of the auxiliary lens by controlling the processing unit based on the second target lens shape, and drills the auxiliary lens by controlling the drilling unit based on the second hole position and the third hole positions when the auxiliary lens processing mode is selected.

(2) The eyeglass lens processing apparatus according to (1) further comprising:

a memory for storing a plurality of separation distances which corresponds to a plurality of bridges having different length, respectively; and a selector for selecting one of the separation distances stored in the memory.

(3) The eyeglass lens processing apparatus according to (2) further comprising:

a display unit which displays, on a screen, a left target lens shape diagram of the left auxiliary lens and a right target lens shape diagram of the right auxiliary lens side by side based on the second target lens shape and the right target lens shape-to-left target lens shape distance, and superimposes hole diagrams of the third holes on the left and right target lens shape diagrams, respectively, based on the selected separation distance; and an adjustment data input unit for inputting adjustment data of the third hole positions in a vertical direction, wherein the display unit changes positions of the hole diagrams of the third holes in the vertical direction with respect to the left and right target lens shape diagrams based on the adjustment data, and the determination unit determines the third hole positions based on the selected separation distance and the adjustment data.

(4) The eyeglass lens processing apparatus according to (1) further comprising a memory for storing a plurality of separation distances which corresponds to a plurality of bridges having different length, respectively, wherein the determination unit selects one of the separation distances stored in the memory based on the right target lens shape-to-left target lens shape distance and a size of the second target lens shape.

(5) The eyeglass lens processing apparatus according to (1) further comprising a type selector for selecting one of a metal type eyeglass frame and a rimless type eyeglass frame, wherein the determination unit determines whether the second target lens shape is made to have a same shape as the first target lens shape or the second target lens shape is made to have a size enlarged from the first target lens shape by a predetermined amount based on the type selected by the type selector.

(6) The eyeglass lens processing apparatus according to (1), wherein the determination unit determines a positional relationship of the second hole with respect to a center of the second target lens shape so as to be identical to coincide with a positional relationship of the first hole with respect to a center of the first target lens shape.

(7) The eyeglass lens processing apparatus according to (1), wherein the determination unit automatically determines shapes of the second and third holes when the auxiliary lens processing mode is selected, the shapes being stored in a memory.

DETAILED DESCRIPTION OF EXEMPLARY EMBODIMENTS

Figure 2:
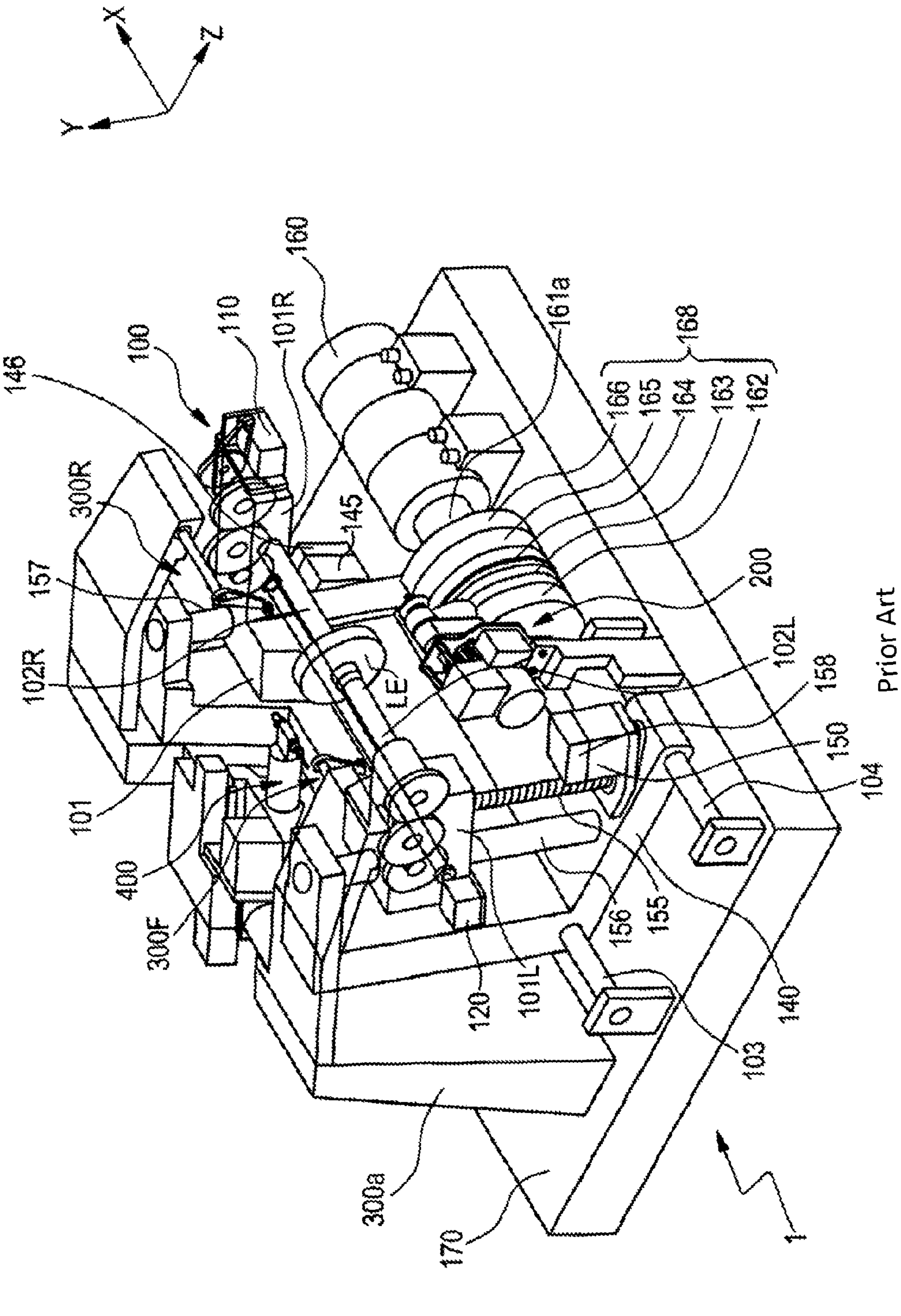
FIG. 2 is a schematic structural view of a processing unit of an eyeglass lens processing apparatus.

Hereinafter, an embodiment of the present invention will be described based on the drawings. FIG. 2 is a schematic structural view of a processing unit of an eyeglass lens processing apparatus.

A carriage unit 100 is mounted on a base 170 of an apparatus body 1. The periphery of an eyeglass lens LE sandwiched between lens chuck shafts 102L and 102R of a carriage 101 is processed while being pressed against a grindstone group 168 as a lens periphery processing tool attached coaxially with a grindstone spindle (grindstone rotation axis) 161*a*. The grindstone group 168 includes: a rough grindstone 162 for glass; a high-curve bevel finishing grindstone 163 having a bevel forming a bevel on a high-curve lens; a finishing grindstone 164 having a V-groove (bevel groove) VG forming a bevel on a low-curve lens and a flat processing surface; a polishing grindstone 165; and a rough grindstone 166 for plastic. The grindstone spindle 161*a* is rotated by a motor 160.

The lens chuck shaft 102L and the lens chuck shaft 102R are coaxially held by a left arm 101L and a right arm 101R of the carriage 101 so as to be rotatable, respectively. The lens chuck shaft 102R is moved toward the lens chuck shaft 102L side by a motor 110 attached to the right arm 101R, and the lens LE is held by the two lens chuck shafts 102R and 102L. The two lens chuck shafts 102R and 102L are rotated in synchronism with each other through a rotation transmission mechanism such as a gear by a motor 120 attached to the left arm 101L. These members constitute lens rotation means.

The carriage 101 is mounted on an X-axis movement support base 140 movable along shafts 103 and 104 extending parallel to the lens chuck shafts 102R and 102L and the grindstone spindle 161*a*. A non-illustrated ball screw extending parallel to the shaft 103 is attached to a rear part of the support base 140. The ball screw is attached to the rotation axis of a motor 145 for X-axis movement. By the rotation of the motor 145, the carriage 101 together with the support base 140 is linearly moved in an X-axis direction (the axial direction of the lens chuck shafts). These members constitute X-axis direction movement means. The rotation axis of the motor 145 is provided with an encoder 146 as a detector that detects the movement of the carriage 101 in the X-axis direction.

Shafts 156 and 157 extending in a Y-axis direction (the direction in which the axis-to-axis distance between the lens chuck shafts 102R and 102L and the grindstone spindle 161*a* is varied) are fixed to the support base 140. The carriage 101 is mounted on the support base 140 so as to be movable in the Y-axis direction along the shafts 156 and 157. A motor 150 for Y-axis movement is fixed to the support base 140. The rotation of the motor 150 is transmitted to a ball screw 155 extending in the Y-axis direction, and the carriage 101 is moved in the Y-axis direction by the rotation of the ball screw 155. These members constitute Y-axis direction movement means. The rotation axis of the motor 150 is provided with an encoder 158 as a detector that detects the movement of the carriage 101 in the Y-axis direction.

Figure 3:
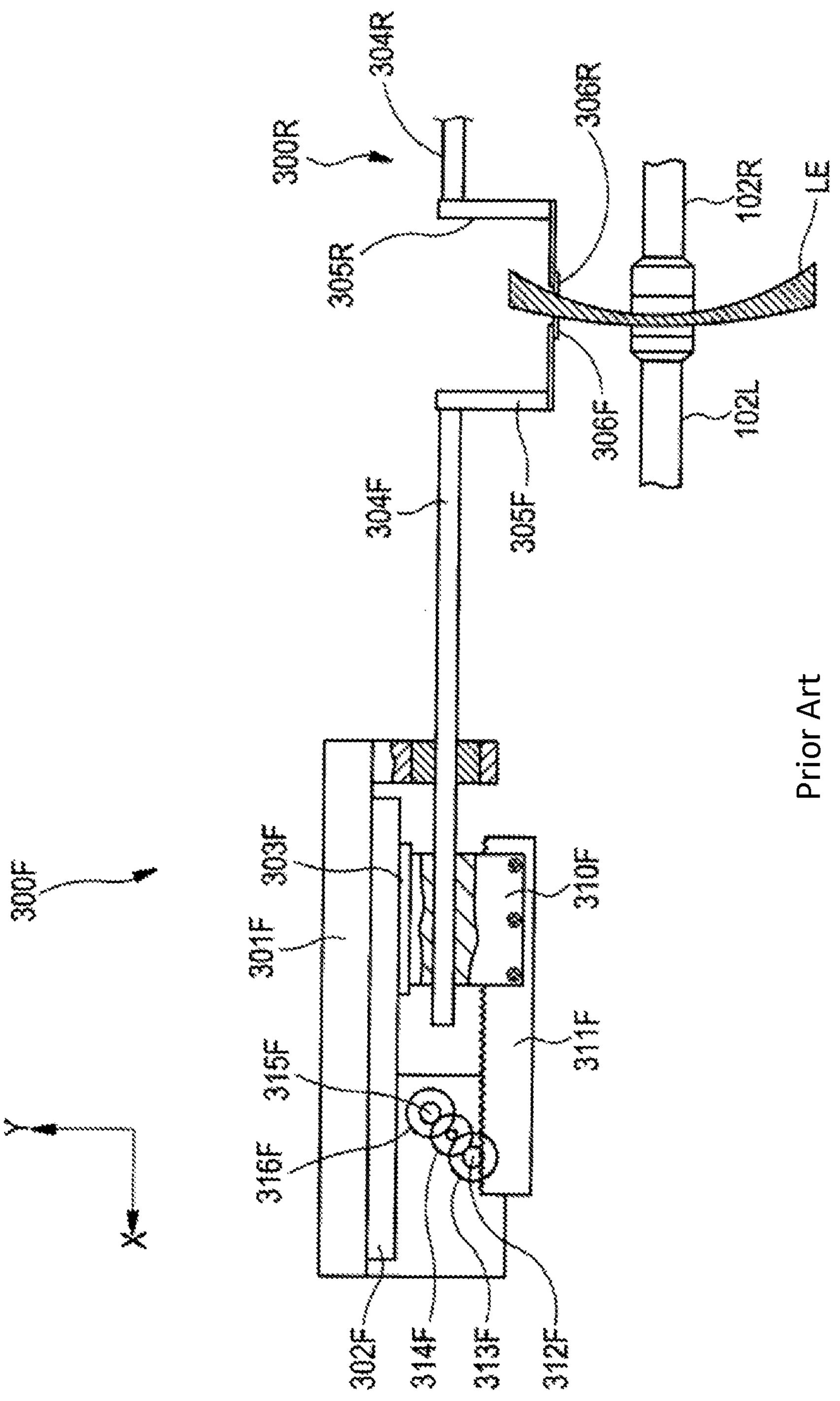
FIG. 3 is a schematic structural view of a target lens shape measurement unit.

In FIG. 2, target lens shape measurement units (lens edge position detection units) 300F and 300R are provided above the carriage 101. FIG. 3 is a schematic structural view of the measurement unit 300F that measures the lens edge position of the lens front surface. An attachment support base 301F is fixed to a support base block 300*a* secured onto the base 170 of FIG. 2, and a slider 303F is attached so as to be slidable on a rail 302F fixed to the attachment support base 301F. A slide base 310F is fixed to the slider 303F, and a tracing stylus arm 304F is fixed to the slide base 310F. An L-shaped hand 305F is fixed to an end of the tracing stylus arm 304F, and a tracing stylus 306F is fixed to an end of the hand 305F. The tracing stylus 306F is in contact with the front refractive surface of the lens LE.

A rack 311F is fixed to a lower end portion of the slide base 310F. The rack 311F meshes with a pinion 312F of an encoder 313F fixed to the attachment support base 301F side. The rotation of a motor 316F is transmitted to the rack 311F through a gear 315F, an idle gear 314F and the pinion 312F, so that the slide base 310F is moved in the X-axis direction. During the lens edge position measurement, the motor 316F pushes the tracing stylus 306F against the lens LE with a constant force at all times. The force with which the tracing stylus 306F is pushed against the lens refractive surface by the motor 316F is light so that the lens refractive surface is not flawed. Means for applying the force with which the tracing stylus 306F is pushed against the lens refractive surface may be known pressure applying means such as a spring. The encoder 313F detects the movement position of the tracing stylus 306F in the X-axis direction by detecting the movement position of the slide base 310F. The edge position of the front surface of the lens LE (including the lens front surface position) is measured based on the information on the movement position, information on the rotation angles of the lens chuck shafts 102L and 102R and information on the movement in the Y-axis direction.

Since the structure of the measurement unit 300R that measures the edge position of the rear surface of the lens LE is symmetrical to that of the measurement unit 300F, the letter "F" following the reference numerals assigned to the structural elements of the measurement unit 300F illustrated in FIG. 3 is changed to "R", and a description thereof is omitted.

In the lens edge position measurement, the tracing stylus 306F is made to abut on the lens front surface, and a tracing stylus 306R is made to abut on the lens rear surface. Under this condition, the carriage 101 is moved in the Y-axis direction based on the target lens shape data and the lens LE is rotated, whereby the edge positions of the lens front surface and the lens rear surface for lens periphery processing are simultaneously measured. In an edge position measurement unit in which the tracing stylus 306F and the tracing stylus 306R are integrally movable in the X-axis direction, the lens front surface and the lens rear surface are separately measured. While the lens chuck shafts 102L and 102R are moved in the Y-axis direction in the target lens shape measurement units 300F and 300R, a mechanism may be adopted in which the tracing stylus 306F and the tracing stylus 306R are relatively moved in the Y-axis direction.

Figure 4:
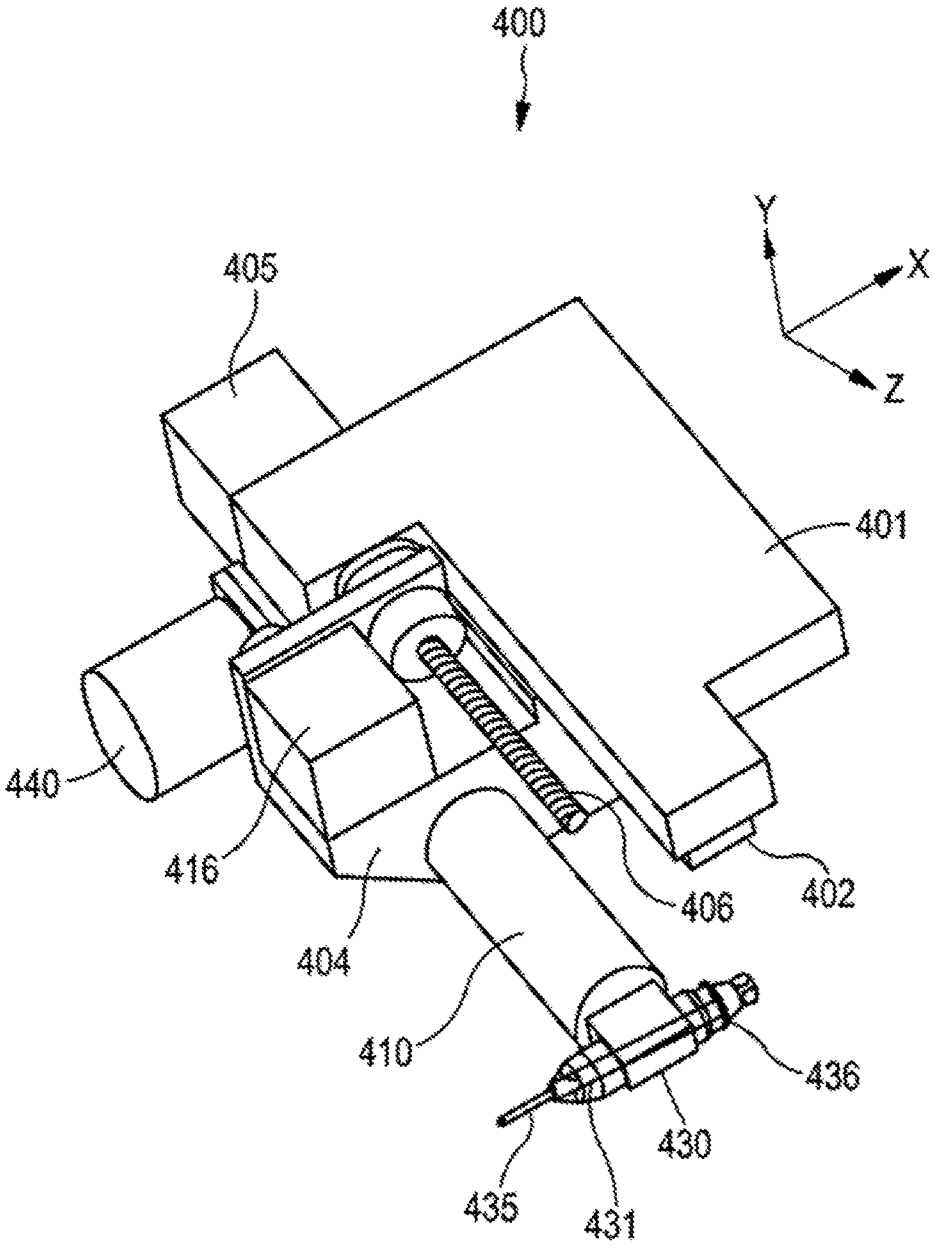
FIG. 4 is a schematic structural view of a drilling and grooving mechanism.

In FIG. 2, a drilling and grooving mechanism 400 is disposed behind the carriage unit 100. FIG. 4 is a schematic structural view of the mechanism 400. A fixed plate 401 serving as the base of the mechanism 400 is fixed to a block (not shown) disposed on the base 170 of FIG. 2 in a standing condition. A rail 402 extending in a z-axis direction (the direction orthogonal to the X-Y plane) is fixed to the fixed plate 401, and a z-axis movement support base 404 is attached so as to be slidable along the rail 402. The movement support base 404 is moved in the z-axis direction by a motor 405 rotating a ball screw 406. A rotation support base 410 is rotatably held by the movement support base 404. The rotation support base 410 is axially rotated by a motor 416 through a rotation transmission mechanism.

A rotary portion 430 is attached to an end of the rotation support base 410. A rotation shaft 431 orthogonal to the axial direction of the rotation support base 410 is rotatably held by the rotary portion 430. An end mill 435 as a drilling tool is coaxially attached to one end of the rotation shaft 431, and a grooving cutter 436 as a grooving tool is coaxially attached to the other end of the rotation shaft 431. The rotation shaft 431 is rotated by a motor 440 attached to the movement support base 404, through a rotation transmission mechanism disposed in the rotary portion 430 and the rotation support base 410. In the present embodiment, the end mill 435 faces the lens front surface, and drilling is performed from the lens front surface side.

As the structures of the carriage unit 100, the measurement units 300F and 300R, and the drilling and grooving mechanism 400, basically, those described in Japanese Unexamined Patent Application Publication No. 2003-145328 (U.S. Pat. No. 6,790,124) may be used.

Figure 5:
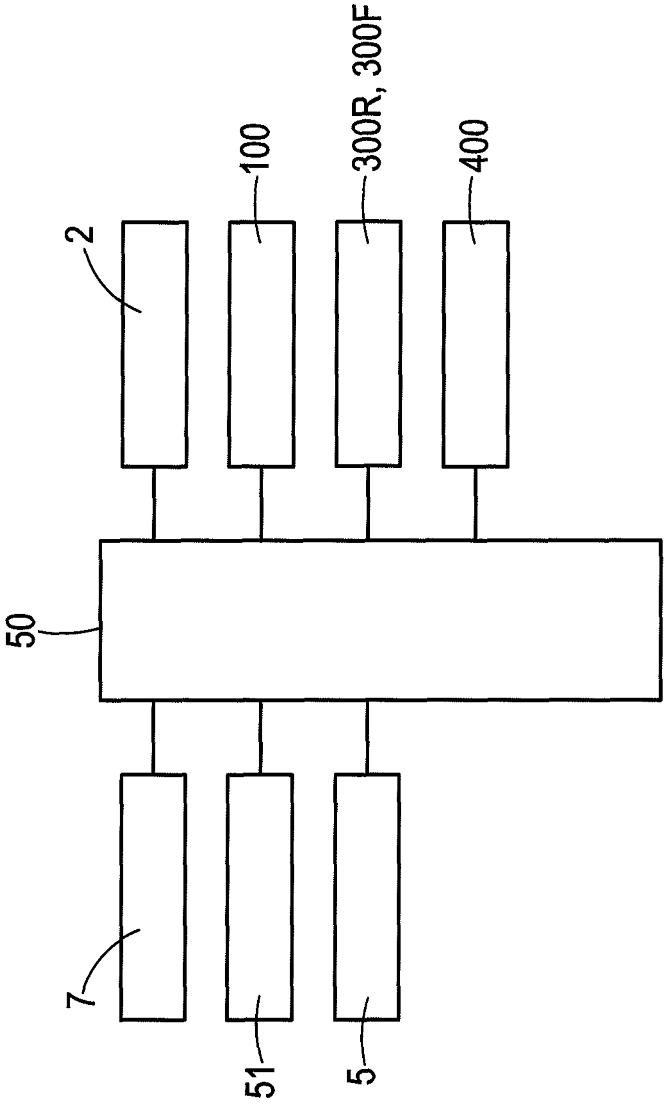
FIG. 5 is a control block diagram of the eyeglass lens processing apparatus.

FIG. 5 is a control block diagram of the eyeglass lens processing apparatus. The following are connected to a control unit 50: an eyeglass frame shape measurement unit 2; a display 5 having a touch panel function; a switch portion 7 where a processing start switch and the like are disposed; a memory 51; the carriage unit 100; the lens position measurement units 300F and 300R; and the drilling and grooving mechanism 400. On the display 5, a predetermined signal can be input to the display on the screen by a touch operation with a finger or a touch pen TP. The control unit 50 receives the input signal by the touch panel function of the display 5, and controls the display of diagrams and information on the display 5.

Next, the operation of the apparatus having the above-described structure will be described. The target lens shape data obtained based on the rim (lens frame) shape measured by the eyeglass frame shape measurement unit 2 is input by pressing a data transfer switch disposed in the switch unit 7, and stored in the memory 51. The target lens shape data is provided in the form of a radius vector length and a radius vector angle.

Figure 6:
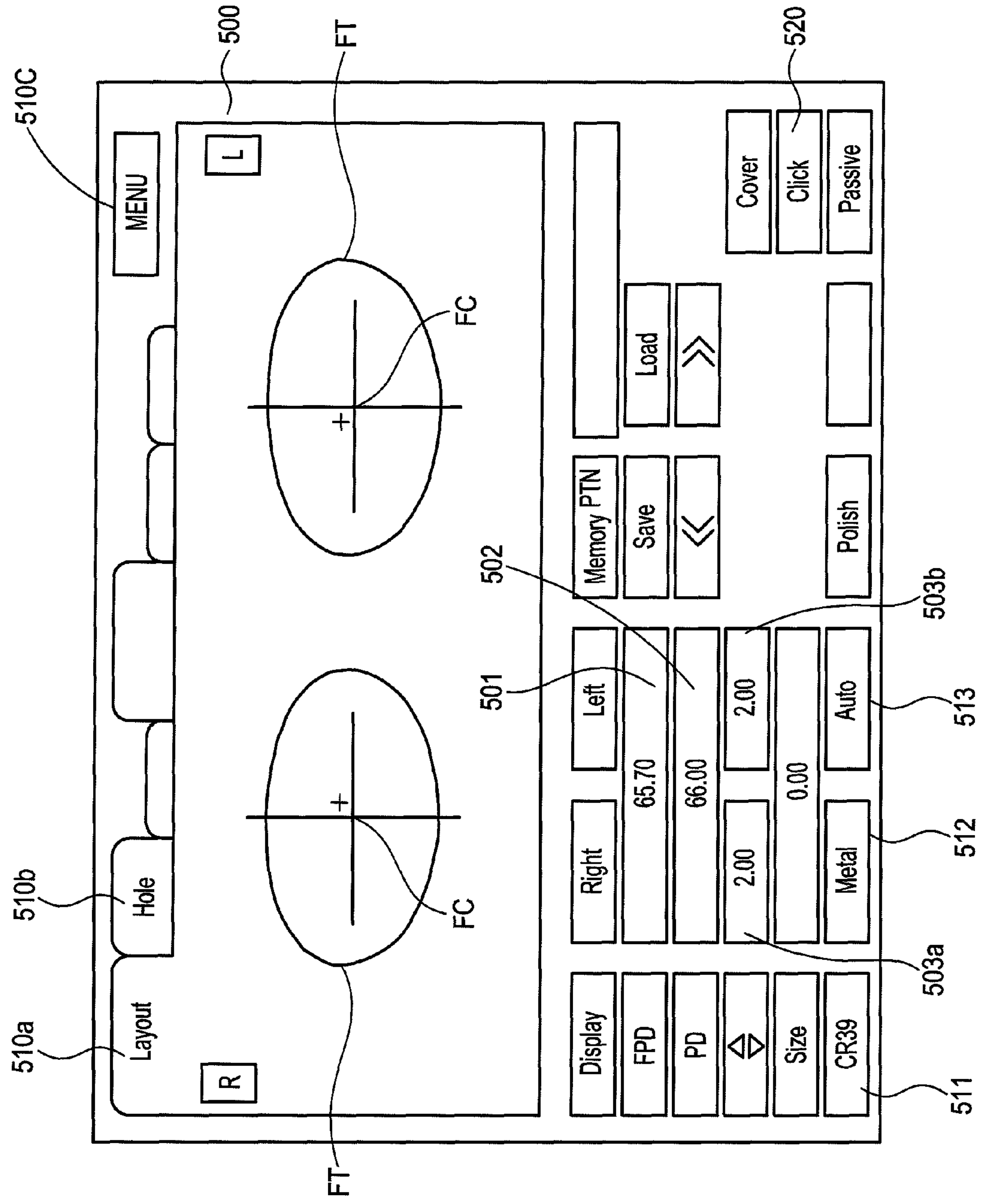
FIG. 6 shows an example of a layout screen for setting eyeglass lens processing conditions.

When the target lens shape data is input, as shown in FIG. 6, the target lens shape diagrams FT of the lens for the right eye and the lens for the left eye are displayed on a layout screen 500 of the display 5. On the layout screen 500 of FIG. 6, the distance (FPD value) between the geometric centers of the right and left rims (F2R and F2L) of an eyeglass frame (F1) is input in an input box 501, the right pupil-to-left pupil distance (PD value) of the user is input in an input box 502, and the heights of the optical centers of the lens LE (lenses F3R and F3L) with respect to the geometric center of the target lens shape data are input in an input box 503*a* and an input box 503*b*, respectively. The geometric center-to-geometric center distance (FPD value) is used as right target lens shape-to-left target lens shape distance data. The numerical value for each box can be input with a numeric keypad that pops up by touching the box. The lens material is selectable with a button 511. The eyeglass frame type (a wire holding type, a full metal type, a cell frame type, a rimless type, etc.) is selectable with a button 512. The processing mode (beveling, flat processing, grooving, drilling for the rimless type, etc.) for the lens periphery and the lens refractive surface is selectable with a button 513. When the button 520 is pressed, as the mode for obtaining an auxiliary lens unit S10, a mode is selected in which data related to the processing of the peripheries of the auxiliary lenses S13R and S13L and data related to the holes for the attachment of the magnets S14 and a bridge S15 are set and the process shifts to a stage of processing the auxiliary lenses S13R and S13L after the processing of the eyeglass lenses (hereinafter, this mode will be referred to as auxiliary lens processing mode).

Figure 7:
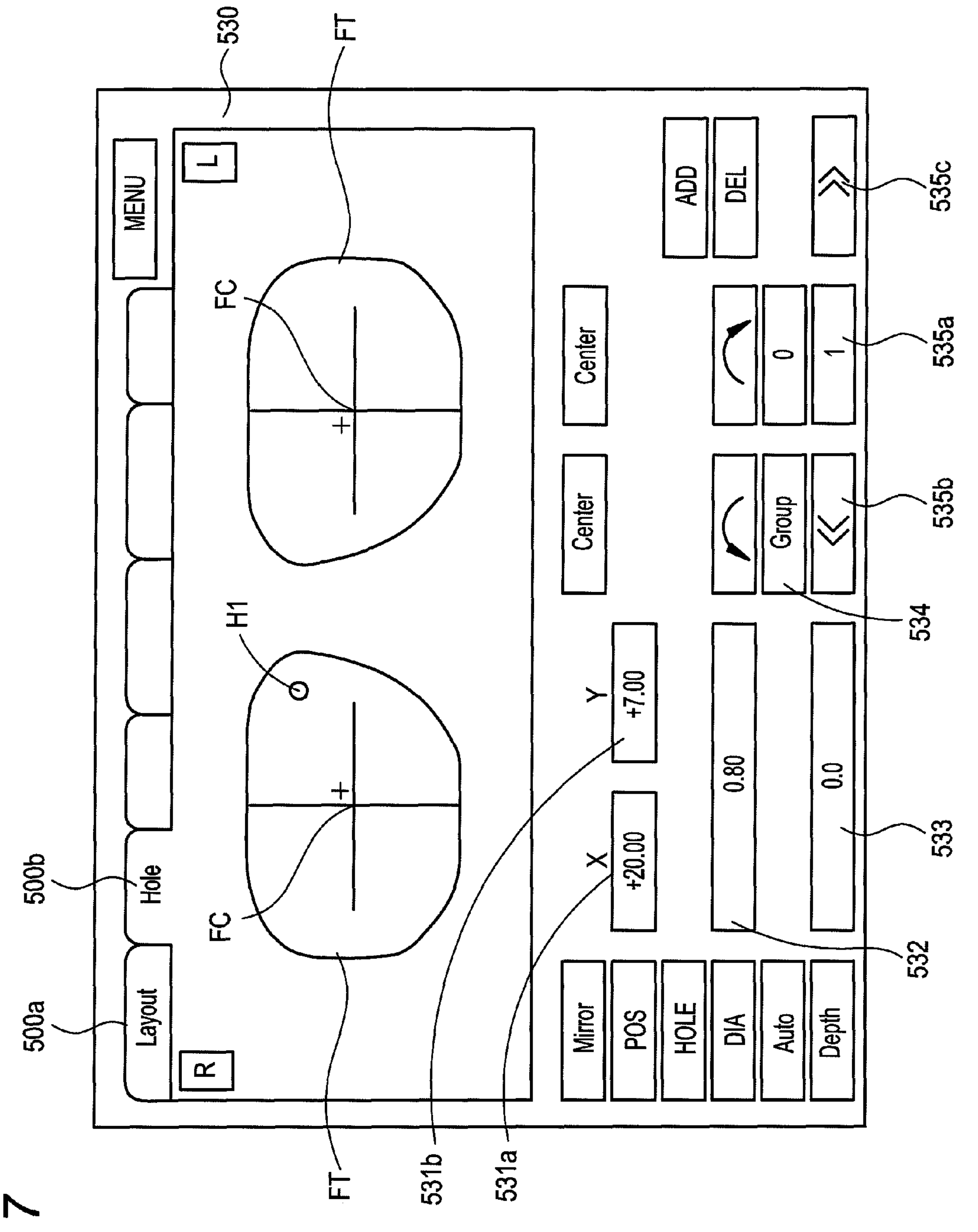
FIG. 7 shows an example of a hole data edit screen.

Prior to the description of the auxiliary lens processing mode, a case will be described where hole data such as the hole position in processing normal eyeglass lenses for the rimless type is set. By pressing a tag 510*b* situated next to a layout screen tag 510*a* in FIG. 6, the screen on the display 5 is switched to a hole data edit screen of FIG. 7. In the example of FIG. 7, since it is an example of a conventional hole data edit screen, the shapes of the illustrated target lens shape diagrams FT are different from those of FIG. 6. However, the target lens shape diagrams FT of the same shapes as those of FIG. 6 are displayed in actuality. In FIG. 7, in input boxes 531*a* and 531*b* for hole position setting, the distances (mm) to the geometric center FC of the target lens shape in an x direction (horizontal direction) and in a y direction (direction orthogonal to the x direction) are input as the hole position data of a hole H1 for the attachment of the rimless frame. In an input box 532, the diameter of the hole H1 is input. In an input box 533, the depth data of the hole H1 is input. Moreover, a setting in which with two holes as a set, the holes are drilled parallel to each other in a direction orthogonal to the lens refractive surface can be made by using a button 534, a button 535 or the like. The method of inputting the hole data is basically similar to that described in Japanese Unexamined Patent Application Publication No. 2006-189659 (U.S. Pat. No. 7,507,142).

Figure 1A:
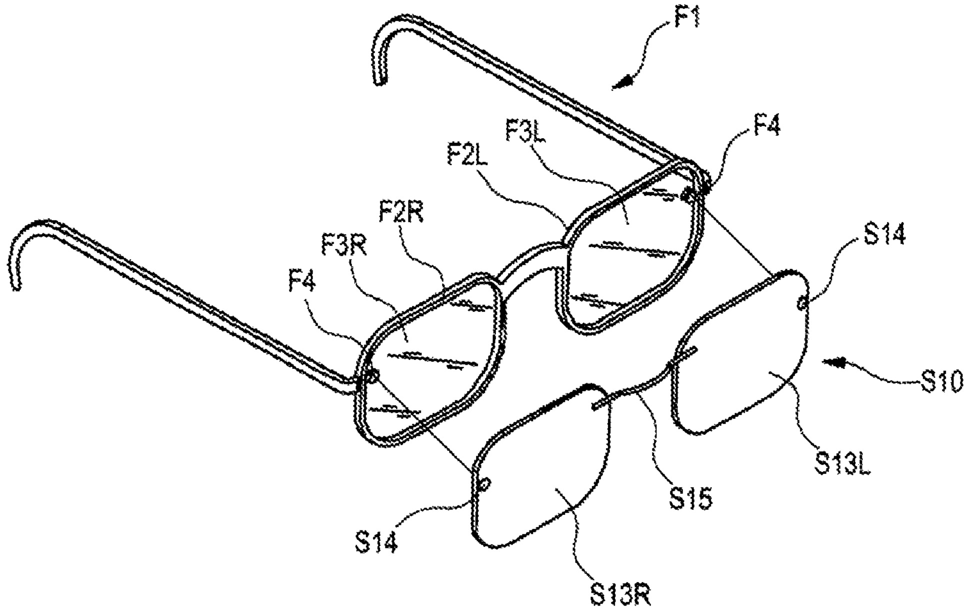
FIG. 1A shows an example of a magnet-type auxiliary lens unit.

By using a screen 530 of FIG. 7, even in the case of the auxiliary lens unit S10 shown in FIG. 1A, the hole data related to the magnets F4 attached to the eyeglass lenses F3R and F3L of the eyeglass frame F1 can be input, and the data related to the holes for the attachment of the magnets S14 and the bridge F15 on the auxiliary lens unit S10 side can be input. However, in inputting the hole data by using this screen, it is necessary to individually set the hole position, the hole diameter and the like. It is necessary that the positions of the holes for the attachment of the magnets S14 on the auxiliary lens unit S10 side appropriately correspond to the positions of the lenses F3R and F3L of the eyeglass frame F1, and it is also necessary that the data of the holes for the attachment of the bridge S15 be appropriately set in accordance with the arrangement of the lenses F3R and F3L of the eyeglass frame F1. These settings are further complicated.

Therefore, by using the auxiliary lens processing mode, even a non-expert can easily set processing conditions such as the hole data of the auxiliary lenses (S13R, S13L) of the auxiliary lens unit S10. When the button 520 of FIG. 6 is pressed, the auxiliary lens processing mode is selected. In the auxiliary lens processing mode, first, a screen 540 for setting (inputting) conditions such as the data of the holes for the attachment of the magnets F4 to the normal eyeglass lenses F3R and F3L is displayed on the display 5 as shown in FIG. 8.

Figure 8:
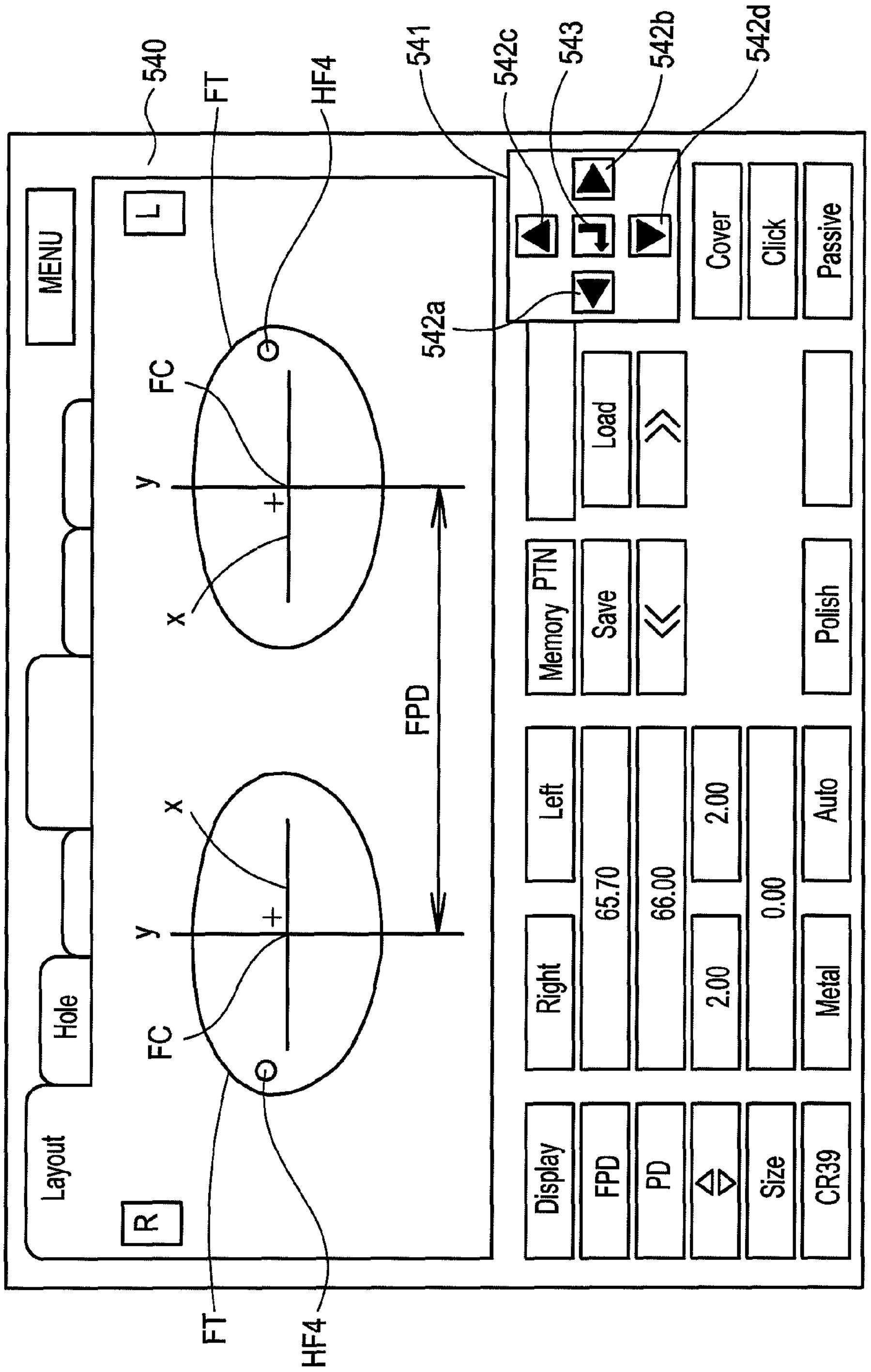
FIG. 8 shows an example of a screen for setting conditions such as hole data for the attachment of magnets to eyeglass lenses.

In FIG. 8, the holes HF4 for the attachment of the magnets F4 are displayed in the target lens shape diagrams FT. The initial values of the positions of the holes HF4 are preregistered in the memory 51. For example, the holes HF4 are situated on the X-axis (horizontal direction) with reference to the target lens shape centers FC, and are set so that an end of the hole is situated 3 mm inside the ear side edge on the X-axis. A pop-up screen 541 having buttons 542*a*, 542*b*, 542*c* and 542*d* for moving the positions of the holes HF4 on the screen 540 in the right-left and vertical directions (the X-axis direction and the Y-axis direction) is displayed on the screen 540 of FIG. 8. The positions of the holes HF4 in the target lens shape diagrams FT are arbitrarily moved by the input by the buttons 542*a*, 542*b*, 542*c* and 542*d*. The operator can set the holes HF4 in desired positions while viewing the disposition of the target lens shape diagrams FT and the holes HF4. When the hole HF4 in the target lens shape diagram FT for the right eye lens is moved with the right eye being specified, the hole HF4 for the left eye lens is moved to the mirror-inverted position. The positions of the holes HF4 on the target lens shapes of the right eye lens and the left eye lens are obtained by the control unit 50 as the distances on the X-axis and the Y-axis with reference to the target lens shape centers FC.

Figure 9:
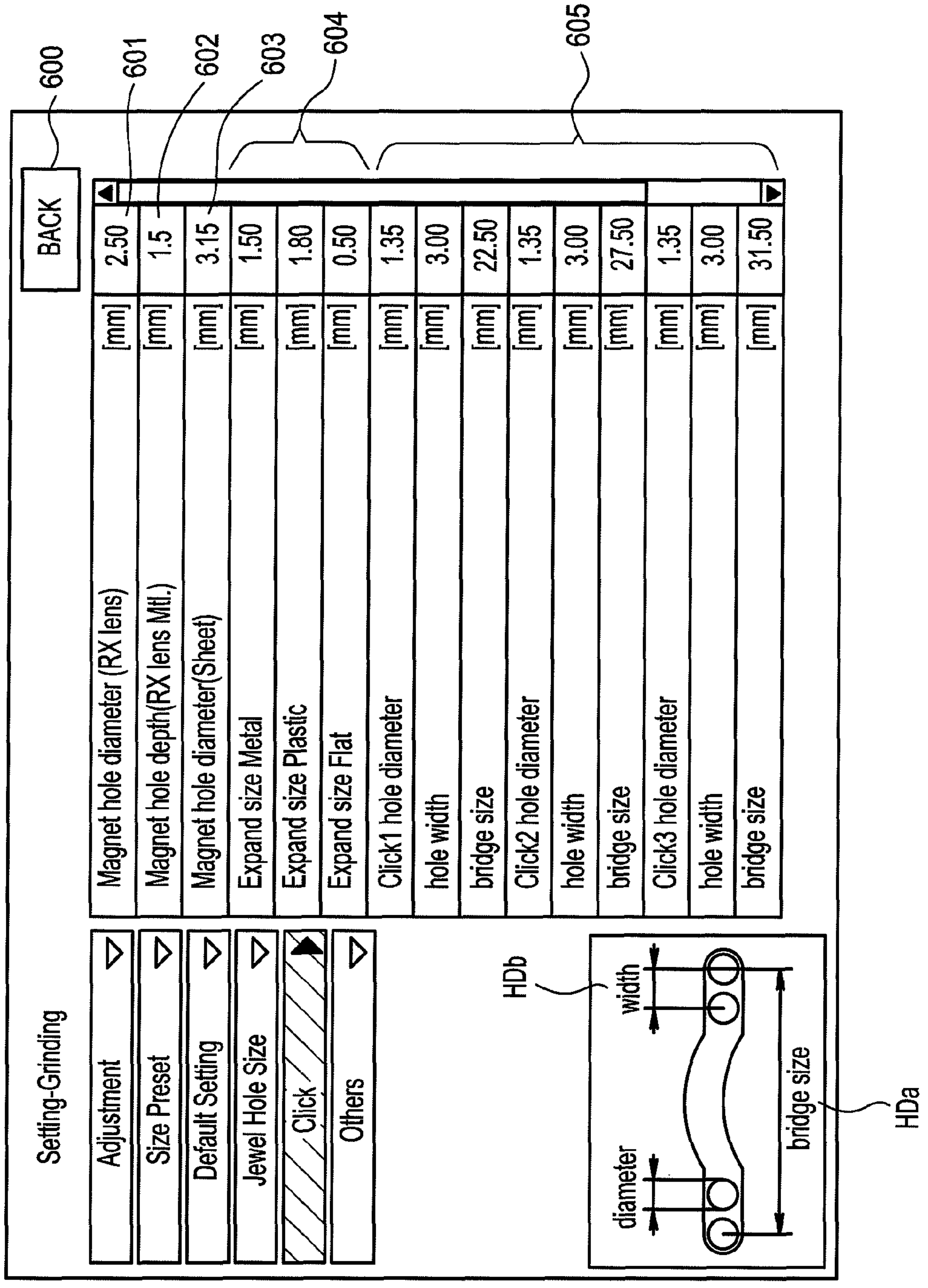
FIG. 9 shows an example of a screen for prestoring attachment hole data, enlarged values of the target lens shape size and the like in a memory.

As the hole configuration data such as the shape, diameter, depth and the like of the holes HF4, data prestored in the memory 51 is applied so that the magnets F4 are appropriately attached. FIG. 9 shows an example of a screen for prestoring, in the memory 51, the set values of the data of the holes for the attachment of the parts, the enlarged values of the target lens shape size of the auxiliary lenses and the like applied in the auxiliary lens processing mode. A screen 600 of FIG. 9 is selected from among menu items displayed by pressing the tag 510*c* of FIG. 6, and displayed on the display 5. On the screen 600 of FIG. 9, the set value of the diameter of the holes HF4 is input in an input box 601, the set value of the depth of the holes HF4 is input in an input box 602, and these set values are stored in the memory 51. The direction of the depth of the hole HF4 is automatically set to the direction of the normal to the lens surface. While the hole shape is a circle in the example of the present apparatus, it may be a square or an elongated hole shape according to the design.

On the screen of FIG. 8, by pressing a button 543 on the pop-up screen 541, the selected positions of the holes HF4 are entered, and the pop-up screen 541 is closed. Thereby, the position data of the holes on the target lens shapes for the attachment of the magnets F4 to the lens LE (the lenses F3R and F3L of the eyeglass frame F1) can be set with an easy operation.

After the completion of the setting of the attachment data of the magnets F4 and other necessary processing conditions, the operator chucks the lens LE (lens F3R) between the lens chuck shafts 102L and 102R, and inputs a processing start signal by a switch of the switch portion 7. It is assumed that setting is made so that the right eye lens is processed first by a switch disposed in the switch unit 7. When the processing start signal is input, the operation to process the lens LE (lens F3R) sandwiched between the lens chuck shafts 102L and 102R is executed. First, the measurement units 300F and 300R are actuated, and the edge positions of the lens front surface and the lens rear surface are measured based on the input target lens shape data. The center position of the hole HF4 in the direction of the lens chuck shaft (x direction) is measured based on the position of the hole HF4.

When the measurement by the measurement units 300F and 300R is finished, the process automatically shifts to the processing of the periphery of the lens LE. The carriage 101 is driven by the control unit 50, and the lens chuck shafts 102L and 102R are moved in the X-axis direction and in the Y-axis direction. After roughing is performed by the rough grindstone 166, finishing processing is performed by the finishing grindstone 164. When the eyeglass frame is a metal frame, the beveling mode is set, and a bevel is formed on the periphery of the lens. When the grooving mode is set, after the lens periphery is flat-finished, a groove is formed in the edge of the lens by the cutter 436 of the drilling and grooving mechanism 400.

When the lens periphery processing is finished, the process automatically shifts to drilling. The drilling and grooving mechanism 400 is driven by the control unit 50, and the hole HF4 is drilled by the end mill 435. At this time, the position of the end mill 435 is controlled based on the hole position data set on the screen 540. The hole angle is set to the direction of the normal at the hole position of the lens. The end mill 435 is driven based on the hole diameter and hole depth data (since the control of the processing by the end mill 435 is known from Japanese Unexamined Patent Application Publication No. 2003-145328 [U.S. Pat. No. 6,790,124], Japanese Unexamined Patent Application Publication No. 2006-189659 [U.S. Pat. No. 7,507,142], etc., details thereof are omitted). After the processing of the right eye lens is finished, the left eye lens is selected by a switch disposed in the switch portion 7, and then, the periphery of the left eye lens and the hole HF4 are successively processed in a similar manner.

Figure 10:
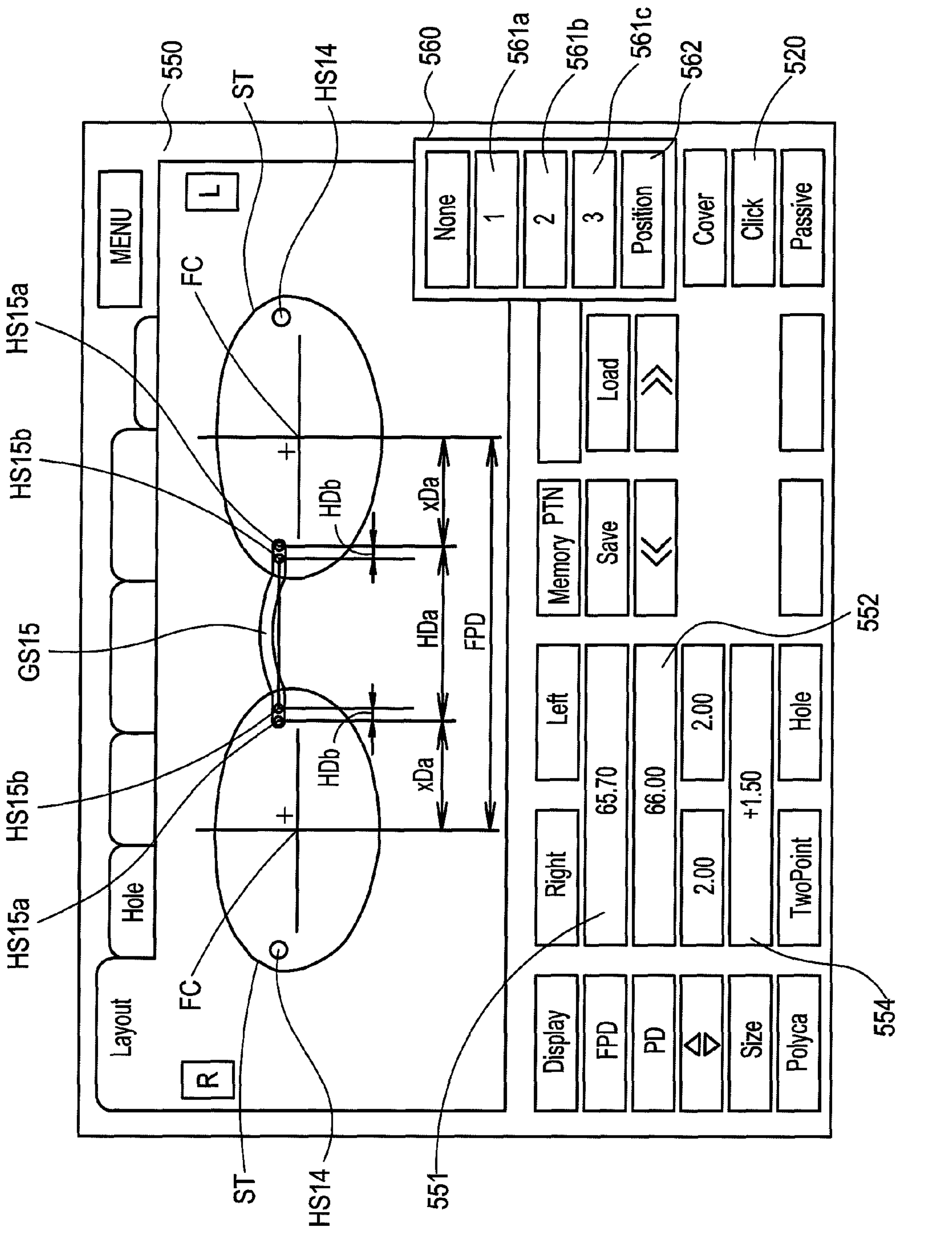
FIG. 10 shows an example of a screen for setting the positions of the holes for the attachment of the auxiliary lenses.

When the auxiliary lens processing mode is selected, after the processing of the right normal lens and the left normal lens is finished (after the hole data of the holes HF4 on the eyeglass lens side is entered), the process shifts to the stage of processing the auxiliary lenses S13R and S13L. When the button 520 of FIG. 6 is pressed, the target lens shapes of the auxiliary lenses S13R and S13L of the auxiliary lens unit S10 are set, and a screen is displayed for setting the positions of the holes for the attachment of the magnets S14 and the bridge S15. FIG. 10 shows an example of the screen. On a screen 550 of FIG. 10, the target lens shape diagrams ST of the right and left auxiliary lenses S13R and S13L are displayed side by side. The target lens shape data of the auxiliary lenses S13R and S13L is based on the target lens shape data of the lens F3R (F3L) input on the initial screen 500 of FIG. 6, and is calculated and input by the control unit 50 as a shape the same as the target lens shape data of the lens F3R (F3L) or a shape slightly enlarged therefrom. In a size input box 554, a value by which the target lens shape size is enlarged (or reduced) from the target lens shape size of the lens F3R (F3L) is input. When a cell frame or a metal frame is selected, a size slightly larger than the target lens shape of the lens F3R (F3L) is set (enlarged by 1.50 mm in the example of FIG. 10), and in the case of a rimless frame, the same size is set. The set value as to whether the target lens shape size of the auxiliary lens S13R (S13L) is made the same according to the selection of the frame or how much the target lens shape size is enlarged is prestored in the memory 51. On the screen 600 of FIG. 9, the set values for enlarging the target lens shape size according to the frame type are input in input boxes 604.

In FIG. 10, the positions (hole center positions) of the holes HS14 where the magnets S14 are attached are automatically set to the same positions as the holes HF4 of the lenses F3R and F3L set on the screen 540 of FIG. 8. That is, the holes HS14 are set in positions whose positions in the x and y directions are the same as those of the holes HF4 with respect to the geometric center FC of the target lens shape. Thereby, the operator is saved from setting the position of the hole HS14 while confirming the position of the hole HF4 on the lens F3R (F3L) side, and can easily make the position of the hole HS14 with respect to the target lens shape correspond to the position of the hole HF4 on the lens F3R (F3L) side.

The position of the hole HS14 of the auxiliary lens S13L is set as one which is the position of the hole HS14 of the auxiliary lens S13R that is mirror-inverted in the horizontal direction. As the diameter of the hole HS14, a value preset according to the size of the magnet S14 is stored in the memory 51, and the value is applied. On the screen 600 of FIG. 9, the set value of the hole diameter of the hole HS14 is input in an input box 603, and stored in the memory 51. As the depth of the hole HS14, since the thickness of the material of the auxiliary lens S13R is approximately 1.0 mm, penetration is set in the example of the present apparatus. When the material of the auxiliary lens S13R is thicker than the magnet S14, as the depth of the hole HS14, a value preset according to the thickness of the magnet S14 is stored in the memory 51.

Next, the setting of the holes for the attachment of the bridge S15 will be described. To fit the auxiliary lenses S13R and S13L of the auxiliary lens unit S10 to the eyeglass frame F1 so as to look nice, it is necessary to attach the bridge S15 so that the distance between the auxiliary lenses S13R and S13L matches with the distance between the lenses F3R and F3L on the eyeglass frame F1 side. Therefore, a value that is set at the time of the processing of the lenses F3R and F3L on the eyeglass frame F1 side is called from the memory 51 and set in an input box 551 for inputting the distance FPD between the geometric centers of the auxiliary lenses S13R and S13L. Moreover, a value that is set on the eyeglass frame F1 side is input in an input box 552 for the pupil-to-pupil distance PD. The target lens shape diagrams FT of the auxiliary lenses S13R and S13L are displayed side by side on the screen 550 so as to be separated by a distance corresponding to the distance between the target lens shapes of the right and left eyeglass lenses F3R and F3L (the right geometric center-to-left geometric center distance FPD is used in the present apparatus).

The operator determines the size (size in the horizontal direction) of the bridge S15 under the condition where the distance FPD between the geometric centers of the auxiliary lenses S13R and S13L matches with that of the eyeglass frame F1 side. For the size of the bridge S15, three different lengths are prepared to obtain the auxiliary lens unit S10. When the button 520 on the display of the screen 550 is pressed, a pop-up screen 560 having buttons for selecting the type and the like of the bridge S15 is displayed. The size of the bridge S15 can be selected by a button 561*a*, 561*b* or 561*c*. When the size of the bridge S15 is selected by the button 561*a*, 561*b* or 561*c*, a diagram GS15 representative of the bridge S15 of the selected size (hereinafter, referred to as bridge diagram GS15) is displayed so as to be superimposed between the right and left target lens shape diagrams ST.

Holes HS15*a* and HS15*b* for the attachment of the bridge S15 of the selected size are displayed so as to be superimposed on the right and left target lens shape diagrams FT (while in this example, the bridge S15 is attached through two holes in one auxiliary lens, in a type in which the bridge is attached through one hole, one hole is displayed on each of the right and left target lens shape diagrams FT).

The positions, in the horizontal direction, of the holes HS15*a* and HS15*b* for the attachment of the bridge S15 on the target lens shapes of the right and left auxiliary lenses S13R and S13L are determined by the control unit 50 based on the right target lens shape-to-left target lens shape distance data of the eyeglass lenses F3R and F3L and the size of the bridge S15. The right target lens shape-to-left target lens shape distance can be input by a various known input methods including a method which geometric center-to-geometric center distance FPD is input as the target lens shape-to-target lens shape distance, a method in which a distance between central side end-to-central side ends of the left and right target lens shapes is input as the target lens shape-to-target lens shape distance, etc. For example, when the geometric center-to-geometric center distance FPD is provided as the right target lens shape-to-left target lens shape distance data of the eyeglass lenses F3R and F3L, and the separation distance HDa of the holes HS15*a* for the attachment of the right and left auxiliary lenses S13R and S13L is provided as the size of the bridge S15 (hereinafter, referred to as bridge size), the distance (distance in the horizontal direction) xDa from the geometric center FC of the target lens shape to the center position of the hole HS15*a* is obtained by xDa=(FPD−HDa)/2. As the position of the hole HS15*b* in the horizontal direction, the distance from the geometric center FC of the target lens shape to the center position of the hole HS15*b* is obtained by the provision of the center-to-center distance HD between the holes HS15*a* and HS15*b* based on the design data of the bridge S15.

The distance HDa as the bridge size and the right center-to-left center distance HDb between the holes HS15*a* and HS15*b* are prestored in the memory 51 for each selectable type of bridge S15. The diameter of the holes HS15*a* and HS15*b* is also prestored in the memory 51 for each selectable type of bridge S15. On the screen 600 of FIG. 9, the distance HDa (bridge size), the distance HDb (width) and the hole diameter (diameter) are input in an input box 605 for the three selectable types of bridge S15, whereby the values are stored in the memory 51.

Figure 11:
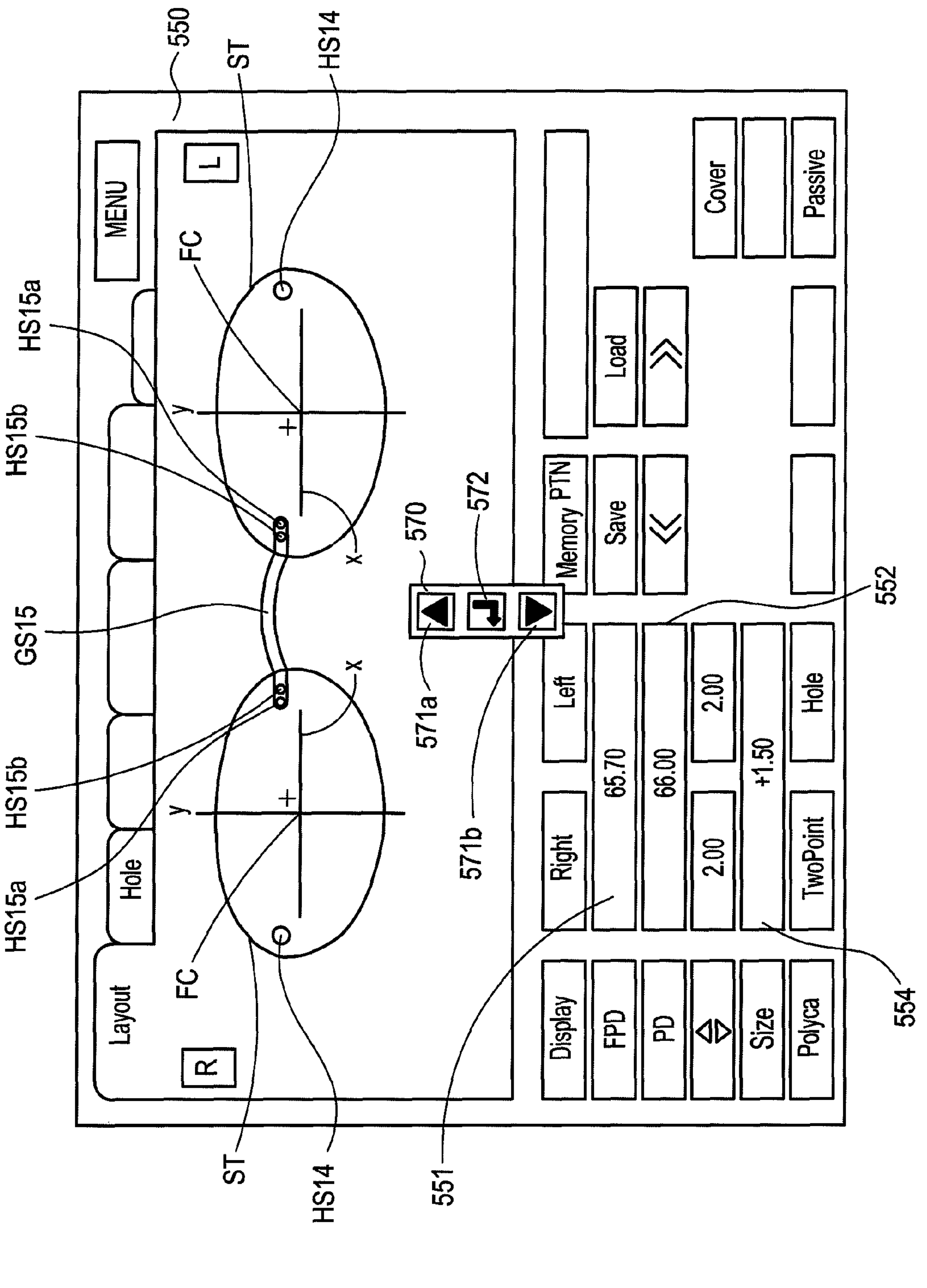
FIG. 11 shows an example of a screen for adjusting the vertical positions of the bridge attachment holes.

The positions, in the vertical direction, of the holes HS15*a* and HS15*b* on the target lens shape may also be automatically determined by the control unit 50 so that they are situated within the target lens shape based on the target lens shape data of the auxiliary lenses S13R and S13L and the positions of the holes in the horizontal direction. However, it is desirable that the positions of the holes HS15*a* and HS15*b* in the vertical direction be adjusted by the operator. The vertical positions of the holes HS15*a* and HS15*b* before the adjustment by the operator are initially set to, for example, the position on the X-axis or the same height as that of the magnet attachment holes HS14. When a button 562 on the pop-up screen 560 is pressed, as shown in FIG. 11, a pop-up screen 570 having buttons for adjusting the vertical positions of the holes HS15*a* and HS15*b* and the like is displayed. By pressing a button 571*a* or 571*b*, the vertical positions of the holes HS15*a* and HS15*b* are moved together with the bridge diagram GS15. The operator adjusts the vertical positions of the holes HS15*a* and HS15*b* so that the positional relationship among the target lens shape diagrams ST, the bridge diagram GS15 and the holes HS15*a* and HS15*b* is a desired one. When a button 572 on the pop-up screen 570 is pressed, the positions of the holes HS15*a* and HS15*b* are entered, and the pop-up screen 570 is closed. Thereby, the positions (hole center positions) of the holes HS15*a* and HS15*b* for the attachment of the bridge S15 of the selected size are set with an easy operation. The positions of the holes HS15*a* and HS15*b* are treated as the position data in the X-axis direction and the Y-axis direction with reference to the target lens shape centers FC like the holes HS14.

The operator can check whether the two holes HS15*a* and HS15*b* are disposed within the right and left target lens shape diagrams ST, whether the size of the bridge diagram GS15 is too long and the like and select the bridge S15 having a desired size by the button 561*a*, 561*b* or 561*c*.

As described above, in setting the position data and diameter data of the holes HS15*a* and HS15*b* of the bridge S15, the hole positions in the horizontal direction are determined based on a predetermined value according to the specifications of the bridge S15 prepared as a part of the auxiliary lens unit S10, so that even a non-expert can easily and appropriately set the data of the holes for the attachment of the bridge S15.

In selecting the size of the bridge S15, a structure may be adopted in which the attachable size of the bridge S15 is calculated by the control unit 50 based on the geometric center-to-geometric center distance FPD and the target lens shape size, and the size is automatically selected by the control unit 50 from the type of bridge S15 preregistered in the memory 51. The operator can check whether the bridge S15 selected by the control unit 50 is appropriate or not by the bridge diagram GS15 on the screen.

After the setting of the target lens shape and hole data for processing the auxiliary lenses S13R and S13L is completed as described above, the auxiliary lens processing is performed. The operator chucks a material sheet of the auxiliary lens between the lens chuck shafts 102L and 102R, and inputs processing start by the switch of the switch unit 7. It is assumed that the auxiliary lens S13R for the right eye is processed first. The input of the processing start signal actuates the measurement units 300F and 300R, and the edge positions of the lens from surface and the lens rear surface are measured based on the target lens shape data of the auxiliary lens S13R. Moreover, the hole positions in the lens chuck shaft direction (x direction) are measured based on the set position data of the holes HS14, HS15*a* and HS15*b*.

After the measurement of the target lens shape and the hole positions is finished, the carriage 101 is driven based on the target lens shape data, the lens chuck shafts 102L and 1028 are moved in the X-axis direction and the Y-axis direction, and the periphery of the auxiliary lens S13 is processed. After roughing is performed by the rough grindstone 166, finishing processing is performed by the finishing grindstone 164. After the processing of the periphery of the auxiliary lens S13R is finished, the process shift to drilling. The drilling and grooving mechanism 400 is driven by the control unit 50 based on the position data of the holes HS14, HS15*a* and HS15*b* and the hole data such as the hole diameter, and the holes are drilled by the end mill 435. After the processing of the auxiliary lens S13R is finished, the processing of the auxiliary lens S13L is performed in a similar manner.

Figure 1B:
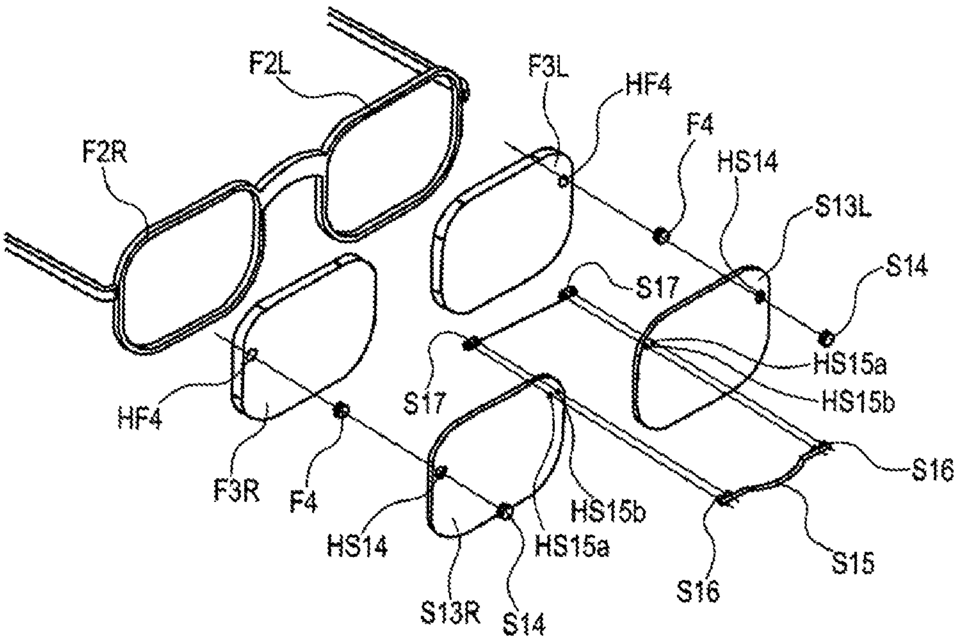
Prior Art FIG. 1B
FIG. 1B is an assembly view of the auxiliary lens unit.

After the eyeglass lenses F3R and F3L and the auxiliary lenses S13R and S13L are processed, the magnets F4 are attached to the eyeglass lenses F3R and F3L as shown in FIG. 1B, and the magnets S14 and the bridge S15 are attached to the auxiliary lenses S13R and S13L, whereby the auxiliary lens unit S10 detachably attachable to the eyeglass frame F1 is obtained. The positions of the holes HF4 on the eyeglass lens side and the positions of the holes HS14 on the auxiliary lens side coincide with each other with high precision and the target lens shape centers of the auxiliary lenses S13R and S13L connected by the bridge S15 and the target lens shape centers of the eyeglass lenses F3R and F3L coincide with each other, whereby the auxiliary lenses S13R and S13L are fitted to the eyeglass frame F1 in a substantially coinciding position so as to look nice.

While the positions of the magnet attachment holes HF4 on the eyeglass lens side are set first in the description given above, a structure may be adopted in which the magnet attachment holes HS14 on the auxiliary lens side are set first and the positions of the holes HF4 on the eyeglass lens side are automatically set by the control unit 50 based on the set data so as to correspond thereto. With this structure, the auxiliary lenses are also fitted to the eyeglass lenses by aligning the positions of the magnets S14 on the auxiliary lens side with the positions of the magnets F4 on the eyeglass lens side.

What is claimed is:

1. An eyeglass lens processing apparatus for processing an eyeglass lens, comprising:

a lens chuck shaft which chucks the lens;

a processing unit including a periphery processing tool for processing a periphery of the lens;

a drilling unit including a drilling tool for drilling the lens;

a mode selector for selecting an auxiliary lens processing mode processing an auxiliary lens after processing a normal lens, wherein the auxiliary lens is to be attached by a magnet to the normal lens held by an eyeglass frame, an eyeglass data input unit for inputting eyeglass data including a first target lens shape of the normal lens and a right target lens shape-to-left target lens shape distance;

a hole position input unit which has a screen through which a position of a first hole, through which a first magnet is to be attached to the normal lens, is input; and a determination unit which determines, when the auxiliary lens processing mode is selected, a second target lens shape of the auxiliary lens, a position of a second hole through which a second magnet is to be attached to the auxiliary lens, positions of third holes to which a bridge connecting both right and left auxiliary lenses each other is to be attached, wherein the determination unit determines the second target lens shape based on the first target lens shape, determines the second hole position with respect to the second target lens shape based on the first hole position with respect to the first target lens shape, and determines the third hole positions with respect to the second target lens shape based on the right target lens shape-to-left target lens shape distance and a separation distance between the third holes to be processed; and a processing controller which shifts to a stage of processing the auxiliary lens after a stage of processing the normal lens, processes a periphery of the auxiliary lens by controlling the processing unit based on the second target lens shape, and drills the auxiliary lens by controlling the drilling unit based on the second hole position and the third hole positions when the auxiliary lens processing mode is selected.

2. The eyeglass lens processing apparatus according to claim 1 further comprising:

a memory for storing a plurality of separation distances which corresponds to a plurality of bridges having different length, respectively; and a selector for selecting one of the separation distances stored in the memory.

3. The eyeglass lens processing apparatus according to claim 2 further comprising:

a display unit which displays, on a screen, a left target lens shape diagram of the left auxiliary lens and a right target lens shape diagram of the right auxiliary lens side by side based on the second target lens shape and the right target lens shape-to-left target lens shape distance, and superimposes hole diagrams of the third holes on the left and right target lens shape diagrams, respectively, based on the selected separation distance; and an adjustment data input unit for inputting adjustment data of the third hole positions in a vertical direction, wherein the display unit changes positions of the hole diagrams of the third holes in the vertical direction with respect to the left and right target lens shape diagrams based on the adjustment data, and the determination unit determines the third hole positions based on the selected separation distance and the adjustment data.

4. The eyeglass lens processing apparatus according to claim 1 further comprising a memory for storing a plurality of separation distances which corresponds to a plurality of bridges having different length, respectively, wherein the determination unit selects one of the separation distances stored in the memory based on the right target lens shape-to-left target lens shape distance and a size of the second target lens shape.

5. The eyeglass lens processing apparatus according to claim 1 further comprising a type selector for selecting one of a metal type eyeglass frame and a rimless type eyeglass frame, wherein the determination unit determines whether the second target lens shape is made to have a same shape as the first target lens shape or the second target lens shape is made to have a size enlarged from the first target lens shape by a predetermined amount based on the type selected by the type selector.

6. The eyeglass lens processing apparatus according to claim 1, wherein the determination unit determines a positional relationship of the second hole with respect to a center of the second target lens shape so as to be identical to coincide with a positional relationship of the first hole with respect to a center of the first target lens shape.

7. The eyeglass lens processing apparatus according to claim 1, wherein the determination unit automatically determines shapes of the second and third holes when the auxiliary lens processing mode is selected, the shapes being stored in a memory.

* * * * *